United States Patent
Beguin et al.

(10) Patent No.: US 9,775,101 B2
(45) Date of Patent: Sep. 26, 2017

(54) MANAGEMENT OF HANDHELD ELECTRONIC DEVICE

(71) Applicant: Amazon Technologies, Inc., Reno, NV (US)

(72) Inventors: Julien George Beguin, San Francisco, CA (US); John Mathew Depew, Sunnyvale, CA (US); Sean Joseph Henry Oczkowski, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 137 days.

(21) Appl. No.: 14/191,079

(22) Filed: Feb. 26, 2014

(65) Prior Publication Data

US 2015/0245281 A1 Aug. 27, 2015

(51) Int. Cl.
| | | |
|---|---|---|
| H04L 12/28 | (2006.01) |
| H04L 12/16 | (2006.01) |
| H04W 48/16 | (2009.01) |
| H04W 12/06 | (2009.01) |
| G06K 1/12 | (2006.01) |
| H04W 76/02 | (2009.01) |

(52) U.S. Cl.
CPC .......... *H04W 48/16* (2013.01); *H04W 12/06* (2013.01); *G06K 1/12* (2013.01); *H04W 76/021* (2013.01)

(58) Field of Classification Search
CPC ....... H04W 48/16; H04W 76/021; G06K 1/12
See application file for complete search history.

(56) References Cited

U.S. PATENT DOCUMENTS

| 5,703,349 A | 12/1997 | Meyerson et al. |
| 8,538,829 B1 | 9/2013 | Hu et al. |

(Continued)

FOREIGN PATENT DOCUMENTS

| EP | 1016999 | 7/2000 |
| EP | 2693689 | 2/2014 |

(Continued)

OTHER PUBLICATIONS

Bohn, "Hiku smartphone accessory seeks to Kickstart shopping lists with Evernote integration", retrieved at <<http://www.theverge.com/2012/9/25/3386562/hiku-smartphone-accessory-list-evernote>>, The Verge, Sep. 25, 2012, 5 pages.

(Continued)

*Primary Examiner* — Lonnie Sweet
(74) *Attorney, Agent, or Firm* — Lee & Hayes, PLLC

(57) ABSTRACT

In some cases, a scanner of a handheld electronic device may be used to capture a registration identifier (e.g., a registration barcode), and connection information (e.g., one or more wireless credentials) may be determined by scanning the registration barcode. In some cases, the connection information may be stored in a memory of the handheld electronic device and may be used to establish a Wi-Fi connection with a wireless access point (WAP). In some cases, the registration barcode may be translated into multiple screen frames that may be presented in a screen frame sequence via a user interface displayed via a display of an electronic device that is different from the handheld electronic device. The scanner may directly capture the individual frames in the sequence via the display of the other electronic device.

20 Claims, 10 Drawing Sheets

(56) References Cited

U.S. PATENT DOCUMENTS

| | | | |
|---|---|---|---|
| 8,770,484 B2* | 7/2014 | Vanderhulst | H04B 10/116 235/462.01 |
| 2003/0212465 A1 | 11/2003 | Howard et al. | |
| 2006/0236370 A1* | 10/2006 | John | H04L 63/105 726/1 |
| 2008/0108349 A1* | 5/2008 | Ihattula | H04W 8/065 455/435.1 |
| 2009/0124195 A1* | 5/2009 | Kamijoh | G06K 15/1892 455/3.06 |
| 2011/0177792 A1* | 7/2011 | Bruno | H04M 1/66 455/411 |
| 2012/0067943 A1* | 3/2012 | Saunders | G06K 7/1095 235/375 |
| 2012/0150750 A1 | 6/2012 | Law et al. | |
| 2012/0158919 A1 | 6/2012 | Aggarwal et al. | |
| 2013/0018960 A1* | 1/2013 | Knysz | H04L 65/403 709/204 |
| 2014/0047524 A1 | 2/2014 | Auger | |
| 2014/0282924 A1* | 9/2014 | Singhal | H04L 63/0853 726/5 |

FOREIGN PATENT DOCUMENTS

| | | |
|---|---|---|
| WO | WO2012135563 | 10/2010 |
| WO | WO2012172533 | 12/2012 |
| WO | WO2013067044 | 5/2013 |

OTHER PUBLICATIONS

Drell, "Smaller Than Your Phone, This Device Could Keep You Healthy", retrieved at <<http://mashable.com/2013/11/26/tellspec/#:eyJzljoiZilslmkiOiJfa3dtaHJyb2YwNG1manJvaCJ9>>, Mashable Inc., Nov. 26, 2013, 7 pages.

PCT Search Report and Written Opinion mailed May 13, 2015 for PCT Application No. PCT/US15/17384, 11 pages.

PCT Search Report and Written Opinion mailed Jun. 10, 2015 for PCT application No. PCT/US2015/017378, 11 pages.

PCT Search Report and Written Opinion mailed Jun. 18, 2015 for PCT application No. PCT/US2015/017375, 12 pages.

* cited by examiner

```
1000 ─┐
      ↘
```

DETERMINE A REGISTRATION BARCODE BASED AT LEAST IN PART ON A REGISTRATION TOKEN AND WIRELESS CREDENTIAL(S)
1002

TRANSLATE THE REGISTRATION BARCODE INTO A PLURALITY OF SCREEN FRAMES THAT ARE INDIVIDUALLY DETERMINED BASED ON CORRESPONDING DATA IN THE REGISTRATION BARCODE
1004

PRESENT INDIVIDUAL SCREEN FRAMES OF THE PLURALITY OF SCREEN FRAMES IN A SCREEN FRAME SEQUENCE VIA A USER INTERFACE
1006

CONNECT A HANDHELD ELECTRONIC DEVICE TO A WIRELESS NETWORK USING THE WIRELESS CREDENTIAL(S)
1008

REGISTER THE HANDHELD ELECTRONIC DEVICE USING THE REGISTRATION TOKEN AND A DEVICE IDENTIFIER
1010

FIG. 10

MANAGEMENT OF HANDHELD ELECTRONIC DEVICE

BACKGROUND

Configuration of a wireless connection may be difficult. For example, a service set identifier (SSID) and a password may be associated with a particular wireless access point (WAP). For some devices, it may be difficult or inefficient for a user to provide the configuration information to establish a wireless connection with the WAP.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 10 illustrates an example process for registering a handheld electronic device, according to some implementations.

DETAILED DESCRIPTION

This disclosure includes, in part, techniques and arrangements for managing a handheld electronic device. In some cases, the handheld electronic device of the present disclosure may not include a keyboard, a touchscreen, or other input device for the user to identify one or more credentials to establish a wireless connection. As an illustrative, non-limiting example, in the case of a Wi-Fi network, such credentials may include alphanumeric characters or other symbols representing a service set identifier (SSID) and a password associated with a particular wireless access point (WAP). Accordingly, the present disclosure describes presenting a user interface via a display of a different electronic device in order to allow the user to provide the Wi-Fi credential(s). The electronic device may generate and display a registration identifier (e.g., a barcode or other visual identifier, such as an image, a QR code, etc.) that includes information associated with at least the Wi-Fi credential(s) and a registration token received from a server.

The user may activate a scanner of the handheld electronic device to scan the registration barcode, and the handheld electronic device may establish a wireless connection with the WAP using the Wi-Fi credential(s) extracted from the registration barcode. Further, the handheld electronic device may extract the registration token from the registration barcode and communicate the registration token (along with a device identifier) to the server in order to register the handheld electronic device. Upon validation of the registration token, the server may associate the handheld electronic device with a particular customer account, assign a permanent token, and communicate the permanent token to the handheld electronic device.

In some cases, the registration barcode may be printed, and the hard copy may be scanned using the scanner of the handheld electronic device. Alternatively, the user may directly scan a display of the electronic device that generated the registration barcode in order to capture the registration barcode. In some embodiments, the registration barcode may be translated into a sequence of frames to allow the user to scan the registration barcode directly via the display of the electronic device.

Figure 1:
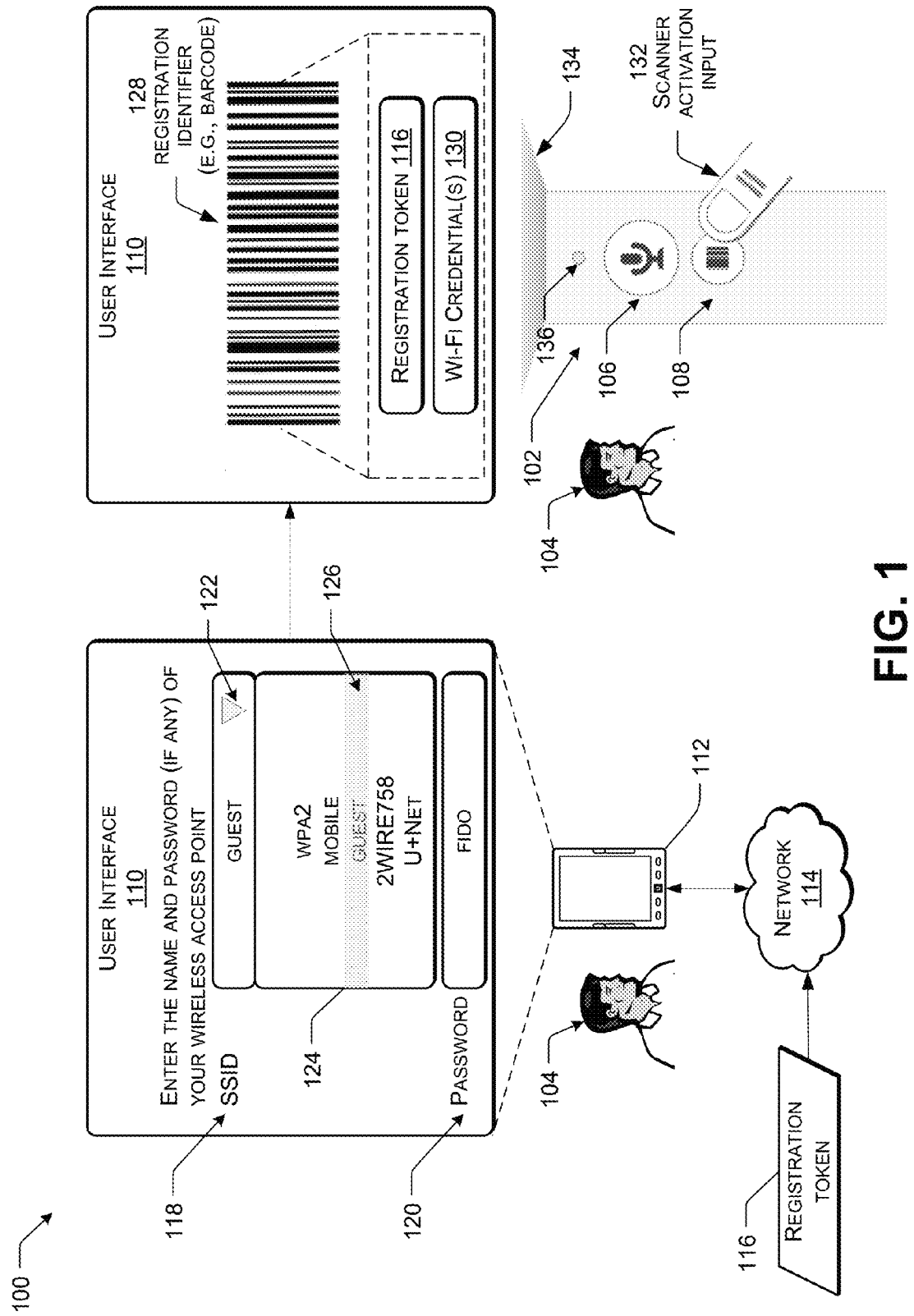
FIG. 1 illustrates an example framework for management of a handheld electronic device, according to some implementations.

FIG. 1 illustrates an example framework 100 for managing a handheld electronic device, according to some implementations. FIG. 1 illustrates an example of a handheld electronic device 102, a user 104, and various operations associated with configuration and registration of the handheld electronic device 102.

In the illustrative example of FIG. 1, the handheld electronic device 102 includes a first selectable control 106 and a second selectable control 108. To illustrate, selection of a particular control by the user 104 may include user actuation of a physical button, trigger, or switch. In the embodiment illustrated in FIG. 1, the first selectable control 106 includes a first user actuatable button identified by a microphone icon, and the second selectable control 108 includes a second user actuatable button identified by a barcode icon. In some examples, the first selectable control 106 may be used to enter a voice input mode, while the second selectable control 108 may be used to enter a scanner input mode.

As illustrated in the example of FIG. 1, the handheld electronic device 102 may not include a touchscreen display, a keyboard, or similar input device. Accordingly, a user interface 110 may be presented on an electronic device 112 that is different from the handheld electronic device 102. For example, the electronic device 112 may include a laptop computer, a desktop computer, a phone, or a tablet computer, among other alternatives. The user interface 110 may allow the user 104 to configure the handheld electronic device 102 to connect to a network 114 and to register the handheld electronic device 102 (e.g., in association with a customer account of a delivery service).

While not shown in FIG. 1, in a particular embodiment, the network 114 may be accessible via a wireless access point (WAP), and one or more Wi-Fi credentials may be associated with the WAP. To illustrate, the WAP may include a gateway or router, which may be connected to the network 114 via a wired or wireless connection (e.g., via a cable modem or a digital subscriber line (DSL) modem, among other alternatives). In some cases, the network 114 may be a publicly accessible network of linked networks, possibly operated by various distinct parties, such as the Internet. In other embodiments, the network 114 may include a private network, personal area network ("PAN"), LAN, WAN, cable network, satellite network, etc. or some combination thereof, each with access to and/or from the Internet. For example, one or more computing devices associated with a delivery service may be located within a single data center and may communicate via a private network.

Figure 2:
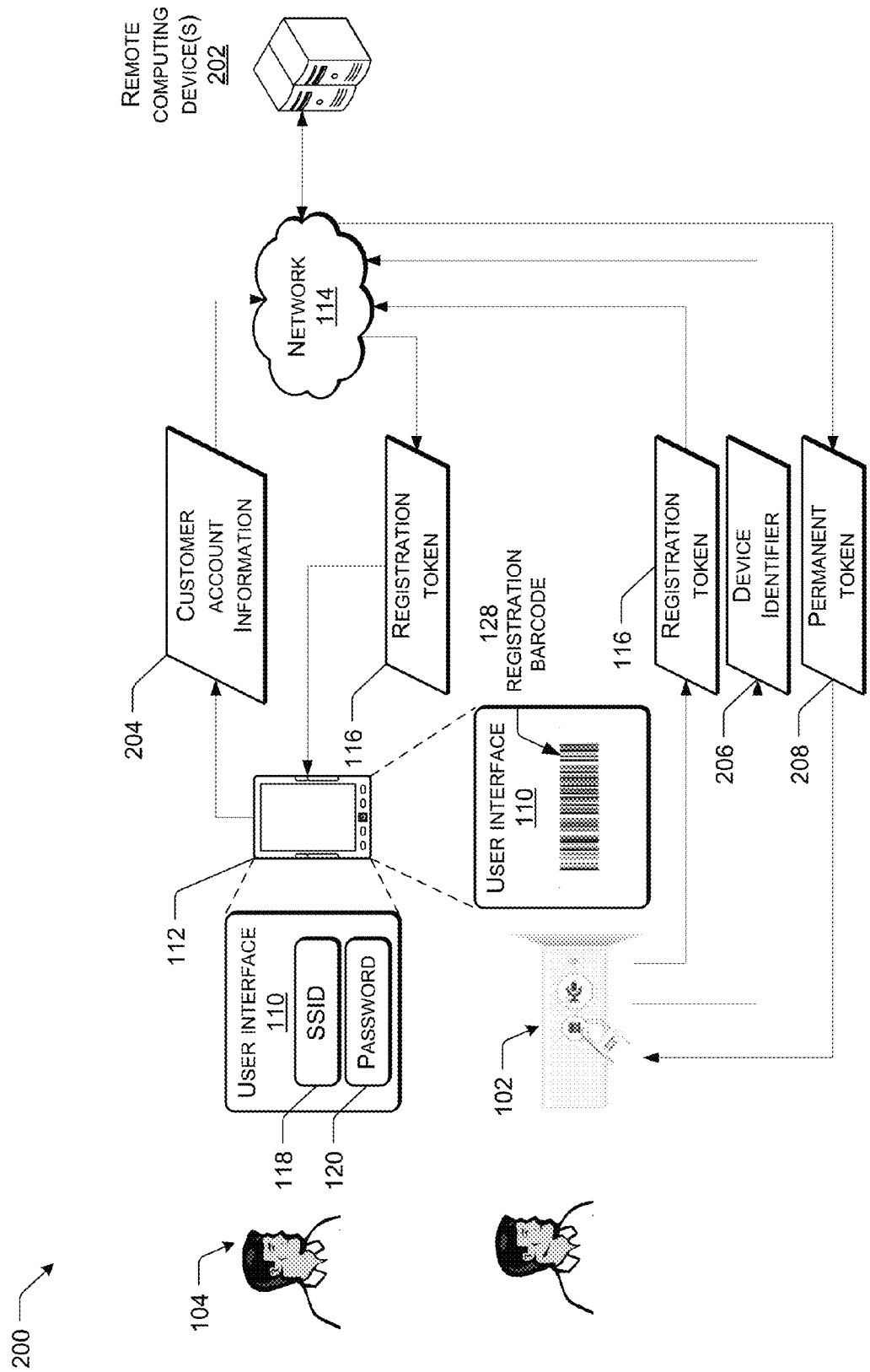
FIG. 2 illustrates an example framework for management of a handheld electronic device, according to some implementations.

In some cases, the electronic device 112 may be configured to present a web browser or alternative application (e.g., a smartphone application) configured to communicate information between the electronic device 112 and one or more remote computing devices via the network 114 (see e.g., the one or more remote computing devices 202 of FIG. 2). In the case of a web browser, the user 104 may access a website (e.g., a delivery service website) via the web browser. While not shown in FIG. 1, in some cases, the user 104 may provide login information (e.g., a username and a password) in order to access a customer account (see e.g., the customer account information 204 of FIG. 2). After authentication, the user 104 may navigate to the user interface 110 (e.g., a "Manage My Devices" page). A server (see e.g., the one or more remote computing devices 202 of FIG. 2) may generate a registration token 116 (e.g., a 128-bit code) and communicate the registration token 116 to the electronic device 112 via the network 114. To illustrate, the server may include a registration service to generate the registration token 116 in response to the user 104 providing the customer account information and/or in response to the user 104 navigating to the user interface 110. In some cases, the registration service may store the registration token 116 as a temporary registration code along with an associated time-to-live (TTL) such as a time period of ten minutes, after which the temporary registration code may expire.

The user interface 110 may allow the user 104 to identify an SSID 118 and an (optional) password 120 associated with the WAP. In some cases, the user 104 may manually enter the SSID 118. Alternatively, as illustrated in the example of FIG. 1, a selectable icon 122 (e.g., a selectable dropdown icon) may allow the user 104 to view a list 124 of one or more selectable SSIDs (e.g., one or more SSIDs detected within a local area of the electronic device 112). In the particular example illustrated in FIG. 1, the user 104 has selected the "Guest" SSID from the list 124, with the selection identified to the user 104 via highlighting, etc., as shown at 126. Further, in the particular example illustrated in FIG. 1, the user 104 has selected identified the password 120 as "fido" for the WAP with the "Guest" SSID. However, it will be appreciated that there may be no password associated with a particular SSID.

FIG. 1 further illustrates that the user interface 110 may display a registration barcode 128. In a particular embodiment, the registration barcode 128 may be generated at the electronic device 112 based on the wireless connection information (e.g., the SSID 118 and the password 120) received from the user 104 and based on the registration token 116 received from the server. As an illustrative non-limiting example, an application (e.g., a web browser application) of the electronic device 112 may include code that is executable by a processor of the electronic device 112 to generate the registration barcode 128, without communicating possibly sensitive wireless connection information (e.g., the SSID 118 and the password 120) to the server via the network 114.

FIG. 1 illustrates that the registration barcode 128 generated at the electronic device 112 includes at least the registration token 116 and one or more Wi-Fi credentials 130. In the illustrative example of FIG. 1, the one or more Wi-Fi credentials 130 encoded into the registration barcode 128 may include the SSID 118 (i.e., "Guest") and the password 120 (i.e., "fido"), among other alternatives. As an illustrative, non-limiting example, access to a particular WAP may be restricted based on a device identifier (e.g., a MAC address). In this case, while not illustrated in the example of FIG. 1, the user 104 may also provide a MAC address or other device identifier of the handheld electronic device 102 via the user interface 110, and the associated information may be encoded into the registration barcode 126 as the one or more Wi-Fi credential(s) 130.

The handheld electronic device 102 includes a scanner (that may be disposed at least partly within a housing), such as a barcode scanner or other optical component (e.g., a camera) that may allow the user 104 to scan a barcode, a quick response (QR) code, radio-frequency identification (RFID) tag, a near-field communication (NFC) identifier, or other identifier. To capture the registration code 128, the user 104 may activate the scanner of the handheld electronic device 102 by providing a scanner activation input 132. To illustrate, in the example of FIG. 1, the second selectable control 108 includes an actuatable button identified by a barcode icon. In this case, the scanner activation input 132 may include the user 104 depressing the second button 108 in order to activate the scanner. To illustrate, the user 104 may depress the second button 108 while the user 104 is pointing the handheld electronic device 102 towards the registration barcode 128.

FIG. 1 illustrates that light associated with an activated scanner, as shown at 134, may serve to notify the user 104 that the scanner is active. Further, in some cases, in response to receiving the scanner activation input 132, the handheld electronic device 102 may provide additional or alternative feedback to alert the user 104 that the scanner is active (e.g., audio such as a beep, music, or speech). Alternatively or additionally, the scanner activation indication may include activation of one or more LEDs 136 of the handheld electronic device 102 or a vibration, among other alternatives.

In some cases, the user 104 may print a paper copy of the registration barcode 128 and scan the printed registration barcode 128 using the scanner of the handheld electronic device 102. Alternatively, as described further below, the user 104 may directly capture the registration barcode 128 presented via a display of the electronic device 112 by placing the scanner of the handheld electronic device 102 in close proximity to the display of the electronic device 112.

The handheld electronic device 102 may include software, hardware, or combination thereof to extract the Wi-Fi credential(s) 130 and the registration token 116 encoded in the registration barcode 128. The handheld electronic device 102 may store the Wi-Fi credential(s) 130 and the registration token 116 in a memory. The handheld electronic device 102 may utilize the Wi-Fi credential(s) 130 stored in the memory to establish a wireless connection with the "Guest" WAP. After establishing the wireless connection using the Wi-Fi credential(s) 130, the handheld electronic device 102 may communicate the registration token 116 to a registration service via the network 114 in order to register the handheld electronic device 102.

In some cases, the handheld electronic device 102 may provide feedback to the user 104 via the handheld electronic device 102 during setup operations. For example, the handheld electronic device 102 may provide feedback to the user 104 to indicate that the handheld electronic device 102 is in a setup mode. In some cases, at least one of the one or more LEDs 136 (e.g., a white LED) may pulse during the setup mode.

In some cases, the feedback may provide an indication to the user 104 that setup was successful. To illustrate, the pulsing LED may become a solid LED after a predetermined period of time (e.g., after five seconds). In other cases, the feedback may provide an indication to the user 104 that setup was not successful. To illustrate, the pulsing LED may become a solid LED of a particular color (e.g., amber) for a predetermined period of time (e.g., for five seconds). Alternatively or additionally, the handheld electronic device 102 may provide audible feedback to indicate whether setup was successful. As a further example, after the predetermined period of time (e.g., five seconds) for the LED to remain solid has elapsed, the solid LED may turn off.

After device configuration and registration, the user 104 may begin scanning barcodes or other visual identifiers to be stored in a memory of the handheld electronic device 102 and communicated to one or more remote computing devices (see e.g., the remote computing device(s) 202 of FIG. 2) via the network 114 (e.g., for item identification processing). FIG. 1 illustrates a particular embodiment in which the handheld electronic device 102 may operate in a scanner input mode or a voice input mode. Accordingly, in the particular example of FIG. 1, after device configuration and registration, the user 104 may select the first button 106 to provide a voice input (e.g., via a microphone) to be stored as audio data in the memory and communicated to the one or more remote computing devices via the network 114 (e.g., for speech processing).

Thus, FIG. 1 illustrates that the user 104 may provide wireless connection information via the user interface 110. The wireless connection information and the registration token 116 received from the server may be used to generate the registration barcode 128. The user 104 may scan the registration barcode 128 using the handheld electronic device 102 to extract the wireless connection information and the registration token and store the associated information in memory. After establishing a wireless connection using the wireless connection information, the handheld electronic device 102 may communicate the registration token 116 via the network 114 for registration of the handheld electronic device 102.

FIG. 2 illustrates an example framework 200 for managing a handheld electronic device, according to some implementations. FIG. 2 illustrates various operations associated with the configuration of the handheld electronic device 102 to communicate via the network 114 and operations associated with the registration of the handheld electronic device 102.

In FIG. 2, the electronic device 112 may communicate with one or more remote computing devices 202 via the network 114. For example, the user 104 may access a website via the electronic device 112 and may communicate customer account information 204 to the one or more remote computing devices 202 via the network 114. To illustrate, in some cases, the website may be associated with a delivery service, and the customer account information 204 may include login information (e.g., a username and a password) to access a customer account of the delivery service. The one or more remote computing devices 202 may authenticate the user 104 based on the received customer account information 204.

In response to the user 104 being successfully authenticated based on the customer account information 204, a registration service of the one or more remote computing devices 202 may generate the registration token 116 (e.g., a 128-bit code). In some cases, the registration service may store the registration token 116 as a temporary registration code along with an associated time-to-live (TTL) such as a time period of ten minutes, after which the temporary registration code may expire. The registration service may communicate the registration token 116 to the electronic device 112 via the network 114.

In some cases, the user 104 may navigate to the user interface 110 (e.g., via a hyperlink) using the electronic device 112 in order to provide the SSID 118 and the password 120. Based on the registration token 116 received from the server and the SSID 118 and password 120 received from the user 104 via the user interface 110, the electronic device 112 may generate the registration barcode 128. FIG. 2 illustrates that the user 104 may scan the registration barcode 128 using the handheld electronic device 102 in order to extract wireless connection information (e.g., the Wi-Fi credentials for a WAP having the SSID 118 of "Guest" and the password 120 of "fido"). The handheld electronic device 102 may establish a wireless connection with the WAP using the Wi-Fi credential(s).

The handheld electronic device 102 may communicate the registration token 116 to the registration service via the network 114 for validation of the registration token 116. Further, in some cases, one or more identifiers (e.g., a device identifier 206 associated with the handheld electronic device 102) may be communicated along with the registration token 116. In some cases, the device identifier 206 may include a serial number of the handheld electronic device 102.

The registration service may compare the registration token 116 received from the handheld electronic device 102 to a stored token and may determine whether a time of receipt of the registration token 116 satisfies the TTL threshold (e.g., ten minutes). If the registration service determines that the received registration token 116 is valid, the registration service may register the handheld electronic device 102 in association with the customer account. In some cases, the registration service may generate a permanent token 208 based at least in part on the device identifier 206 received from the handheld electronic device 102. The registration service may communicate the permanent token 208 to the handheld electronic device 102 via the network to be stored in the memory.

FIGS. 3-6 illustrate example processes 300, 400, 500 and 600 for managing a handheld electronic device, as described above. FIGS. 3-6 illustrate the processes 300, 400, 500 and 600 as a collection of blocks in a logical flow diagram, which represents a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures and environments described in the examples herein, although the processes may be implemented in a wide variety of other architectures or environments.

Figure 3:
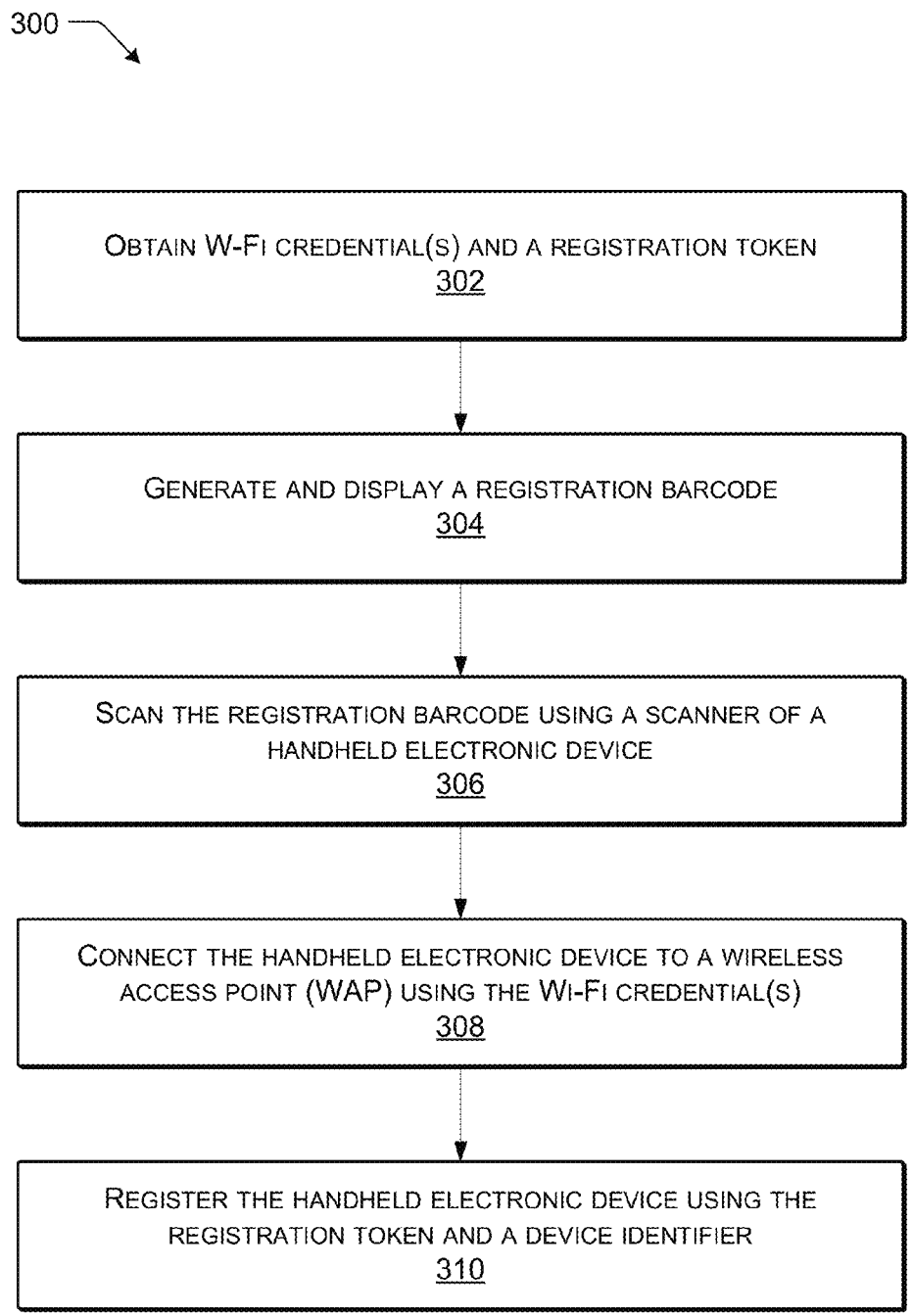
FIGS. 3-5 illustrate example processes for managing a handheld electronic device, according to some implementations.

Referring to FIG. 3, an example process is illustrated and generally designated 300. At 302, the process 300 includes obtaining Wi-Fi credential(s) and a registration token. For example, referring to FIG. 1, the user interface 110 presented via the electronic device 112 may allow the user 104 to provide one or more Wi-Fi credentials (e.g., the SSID 118 and the optional password 120). Further, the electronic device 112 may receive the registration token 116 via the network 114.

At 304, the process 300 includes generating and displaying a registration barcode. For example, referring to FIG. 1, the electronic device 112 may generate and display the registration barcode 128. At 306, the process 300 includes scanning the registration barcode using a scanner of the handheld electronic device. For example, referring to FIG. 1, the user 104 may provide the scanner activation input 132 to scan the registration barcode 128 using the scanner of the handheld electronic device 102. In the illustrative example of FIG. 1, the second selectable control 108 of the handheld electronic device 102 includes a button identified by a barcode icon. FIG. 1 illustrates a particular example in which the scanner activation input 132 includes user actuation of the second button 108 (e.g., while the user 104 is pointing the scanner towards the registration barcode 128).

In some cases, the user 104 may print a paper copy of the registration barcode 128 and scan the paper copy using the scanner of the handheld electronic device 102. Alternatively, as described further below, the user 104 may directly scan the registration barcode 128 presented via the display of the electronic device 112 by placing the scanner of the handheld electronic device 102 in close proximity to the display of the electronic device 112. The handheld electronic device 102 may include software, hardware, or combination thereof to determine the Wi-Fi credential(s) based on an analysis of the registration barcode 128.

At 308, the process 300 includes connecting the handheld electronic device to a wireless access point (WAP) using the Wi-Fi credential(s). For example, referring to FIG. 1, the handheld electronic device 102 may establish a wireless connection with the WAP having the SSID 118 (i.e., "Guest") and the password 120 (i.e., "fido") identified via the user interface 110.

At 310, the process 300 includes registering the handheld electronic device using the registration token and a device identifier associated with the handheld electronic device 102. For example, referring to FIG. 2, the handheld electronic device 102 may communicate the registration token 116 extracted from the registration barcode 128 to the one or more remote computing devices 202 via the network 114. The handheld electronic device 102 may also communicate the device identifier 206 (e.g., a serial number of the handheld electronic device 102) to the one or more remote computing devices 202 via the network 114.

A registration service of the one or more remote computing devices 202 may validate the registration token 116 received from the handheld electronic device 102. For example, if the registration token 116 received from the handheld electronic device 102 matches a stored token and a time of receipt of the registration token 116 does not exceed the TTL (e.g., ten minutes), the registration service may determine that the registration token 116 is valid. The one or more remote computing devices 202 may register the handheld electronic device 102 by using the device identifier 206 to generate the permanent token 208 and store the permanent token 208 in association with a customer account of the user 104. The one or more remote computing devices 202 may communicate the permanent token 208 to the handheld electronic device 102 to be stored in the memory.

Figure 4:
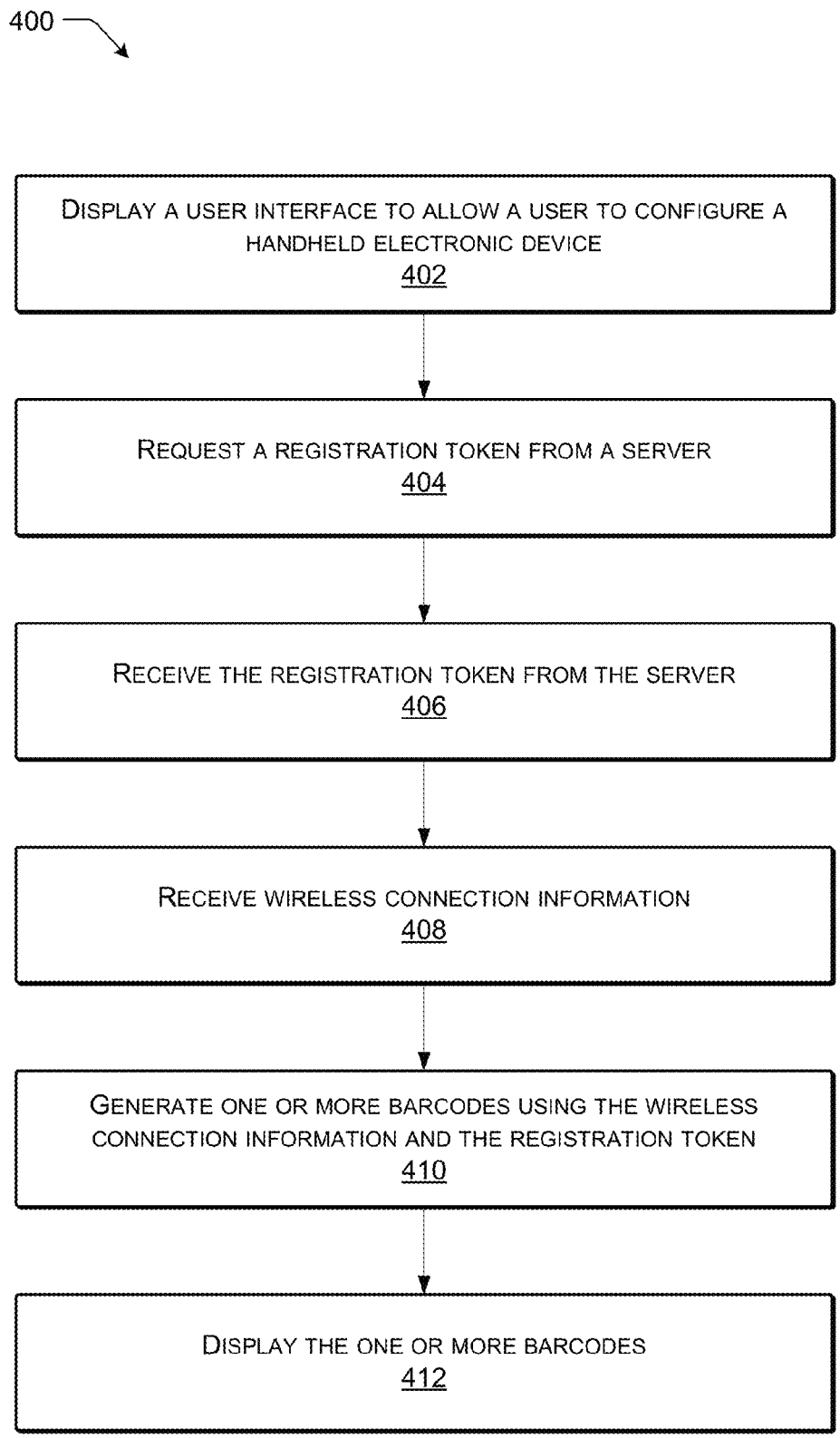

Referring to FIG. 4, another example process is illustrated and generally designated 400. At 402, the process 400 includes displaying a user interface to allow a user to configure a handheld electronic device. For example, referring to FIG. 2, the electronic device 112 may display the user interface 110 to allow the user 104 to provide wireless connection information (e.g., the SSID 118 and the (optional) password 120, among other alternatives).

At 404, the process 400 includes requesting a registration token from a server. For example, referring to FIG. 2, the electronic device 112 may request the registration token 116 from the one or more remote computing devices 202 via the network 114. At 406, the process 400 includes receiving the registration token from the server. For example, referring to FIG. 2, the electronic device 112 receives the registration token 116 from a registration service of the one or more remote computing devices 202.

At 408, the process 400 includes receiving wireless connection information. For example, referring to FIG. 2, the user 104 may provide the wireless connection information (e.g., the SSID 118 and the password 120) via the user interface 110. At 410, the process 400 includes generating one or more barcodes using the wireless connection information and the registration token. For example, referring to FIG. 2, the electronic device 112 may generate the registration barcode 128 based on the wireless connection information received from the user 104 via the user interface 110 and the registration token 116 received from the registration service of the one or more remote computing devices 202. At 412, the process 400 includes displaying the one or more barcodes. For example, referring to FIG. 2, the registration barcode 128 may be displayed via the user interface 110.

Figure 5:
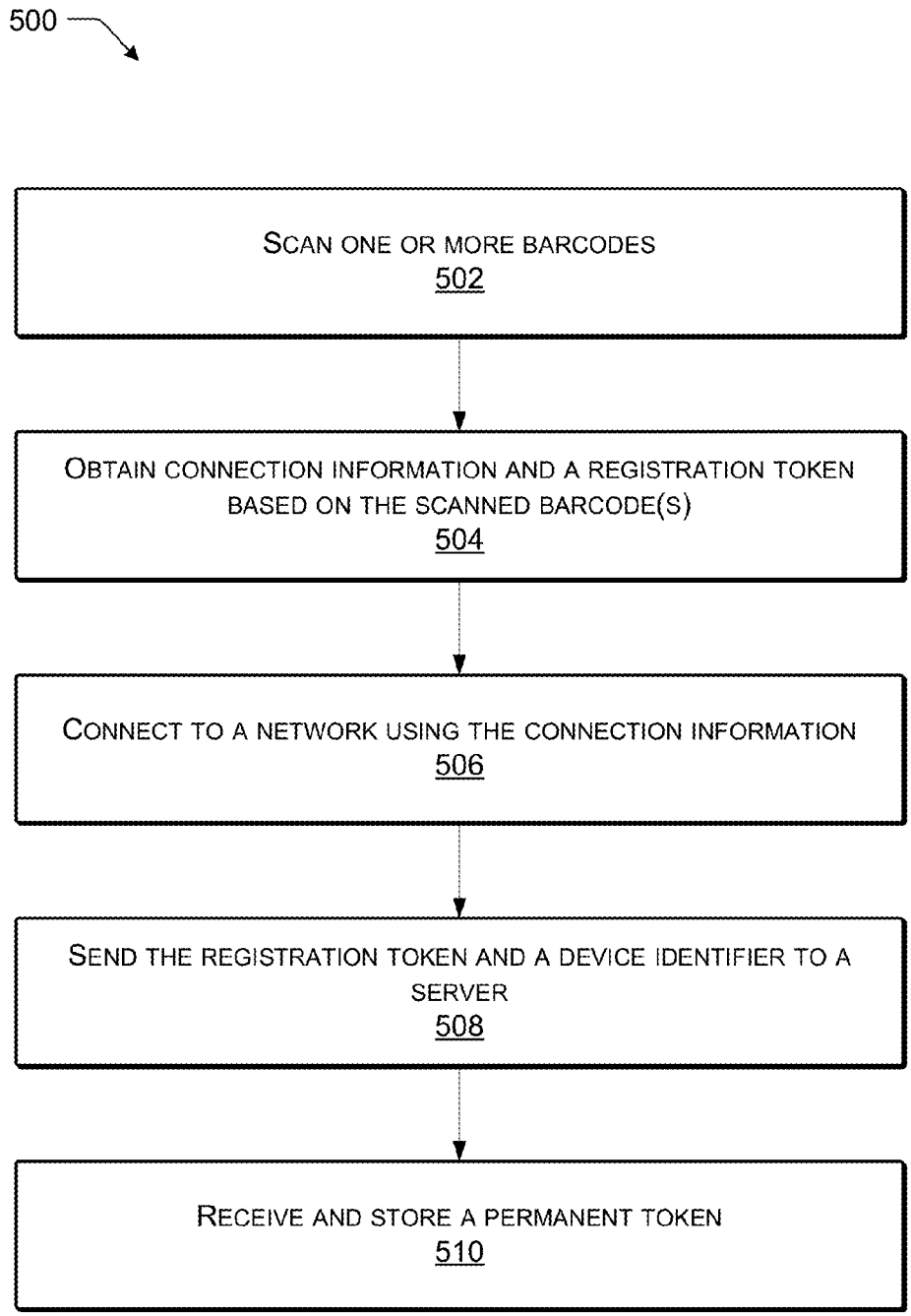

Referring to FIG. 5, another example process is illustrated and generally designated 500. At 502, the process 500 includes scanning one or more barcodes, at 502. For example, referring to FIG. 2, the user 104 may scan the registration barcode 128 using the scanner of the handheld electronic device 102. At 504, the process 500 includes obtaining connection information and a registration token based on the one or more scanned barcodes. For example, referring to FIG. 2, the handheld electronic device 102 may include software, hardware, or combination thereof to extract the connection information (e.g., the SSID 118 and the password 120) and the registration token 116 encoded in the registration barcode 128. The handheld electronic device 102 may store the connection information and the registration token 116 in a memory.

At 506, the process 500 includes connecting to a network using the connection information. For example, referring to FIG. 2, the handheld electronic device 102 may utilize the connection information extracted from the registration barcode 128 and stored in the memory to connect to the network 114. At 508, the process 500 includes sending the registration token and a device identifier to a server. For example, referring to FIG. 2, the handheld electronic device 102 may send the registration token 116 to the one or more remote computing devices 202 via the network 114. Further, in the particular example illustrated in FIG. 2, the handheld electronic device 102 may also send the device identifier 206 (e.g., a device serial number) to the one or more remote computing devices 202 via the network 114.

At 510, the process 500 includes receiving and storing a permanent token. For example, referring to FIG. 2, the one or more remote computing devices 202 may generate the permanent token 208 based at least in part on the device identifier 206 and may communicate the permanent token 208 to the handheld electronic device 102 via the network 114. The handheld electronic device 102 may store the permanent token 208 in the memory.

Figure 6:
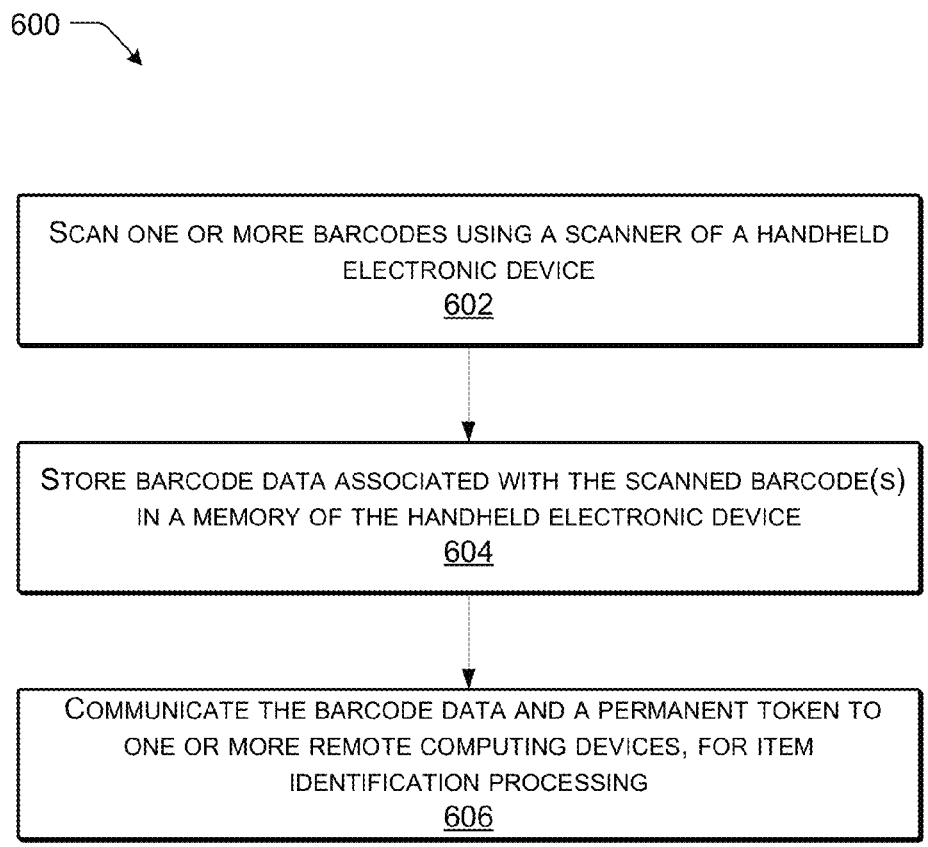
FIG. 6 illustrates an example process of a handheld electronic device providing item identifier data (e.g., barcode data) to one or more remote computing devices for item identification processing, according to some implementations.

Referring to FIG. 6, another example process is illustrated and generally designated 600. FIG. 6 illustrates that, after device configuration and registration, the user 104 may begin scanning barcodes or other visual identifiers to be stored in the memory of the handheld electronic device 102 and communicated to the one or more remote computing devices 202 via the network 114, for item identification processing.

At 602, the process 600 includes scanning one or more barcodes using a scanner of a handheld electronic device. To illustrate, the handheld electronic device 102 illustrated in FIG. 1 includes a second button 108 identified by a scanner icon. To scan one or more barcodes, the user 104 may activate the scanner of the handheld electronic device 102 by depressing the second button 108. At 604, the process 600 includes storing barcode data associated with the one or more scanned barcodes in a memory of the handheld electronic device. At 606, the process 600 includes communicating the barcode data and the permanent token 208 to the one or more remote computing devices 202, for item identification processing.

Figure 7:
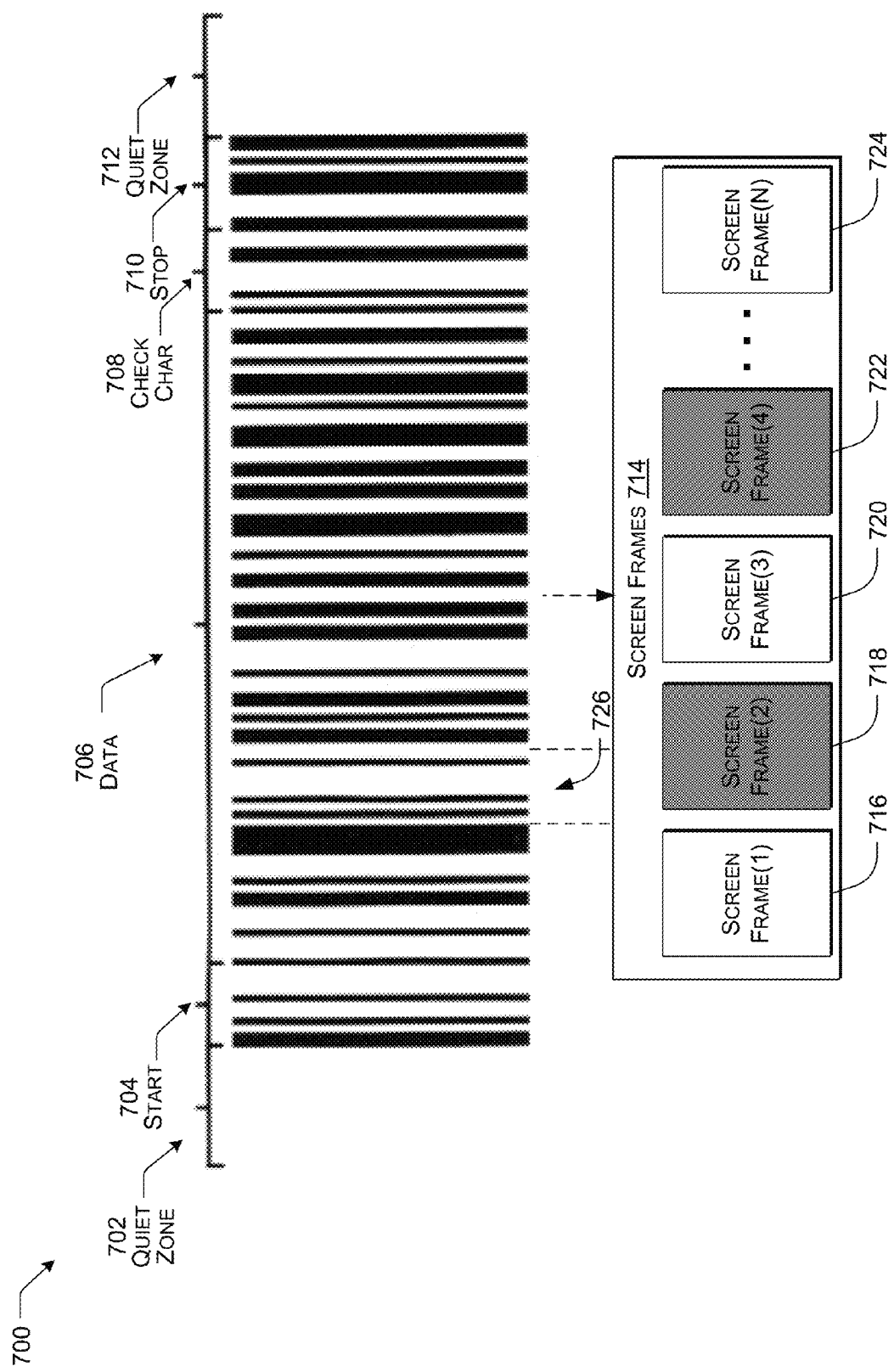
FIG. 7 illustrates an example of a registration identifier (e.g., a registration barcode) that may be transformed into a sequence of frames to be scanned by a handheld electronic device, according to some implementations.

Referring to FIG. 7, an example of a registration barcode being translated into a screen frame sequence is illustrated and generally designated 700. In some cases, translating the registration barcode into a screen frame sequence may improve the ability of the scanner of the handheld electronic device 102 to identify the registration barcode when presented on a display of another electronic device.

FIG. 7 illustrates that various information may be encoded into a registration identifier (e.g., a registration barcode) for scanning. The example registration barcode of FIG. 7 includes a quiet zone 702, an indicator 704 associated with a start of data 706, a checksum character 708, an indicator 710 associated with a stop of the data 710, and another quiet zone 712. FIG. 7 further illustrates an example of translating the registration barcode into a screen frame sequence that may improve the ability of the scanner of the handheld electronic device 102 to identify the registration barcode when presented on a display (e.g., the display of the electronic device 112 of FIG. 1).

In the example of FIG. 7, a portion of a frame sequence that includes a sequence of multiple screen frames 714 corresponding to the barcode data 706 is illustrated. In FIG. 7, the portion of the screen frame sequence includes a first screen frame 716 identified in FIG. 7 as Screen Frame (1), a second screen frame 718 identified as Screen Frame (2), a third screen frame 720 identified as Screen Frame (3), a fourth screen frame 722 identified as Screen Frame (4), and an Nth screen frame 724 identified as Screen Frame (N), corresponding to a particular portion 726 of the data 706 of the registration barcode.

In the example illustrated in FIG. 7, the first screen frame 716 and the third screen frame 720 may include "white" screen frames, while the second screen frame 718 and the fourth screen frame 722 may include "black" screen frames.

Figure 8:
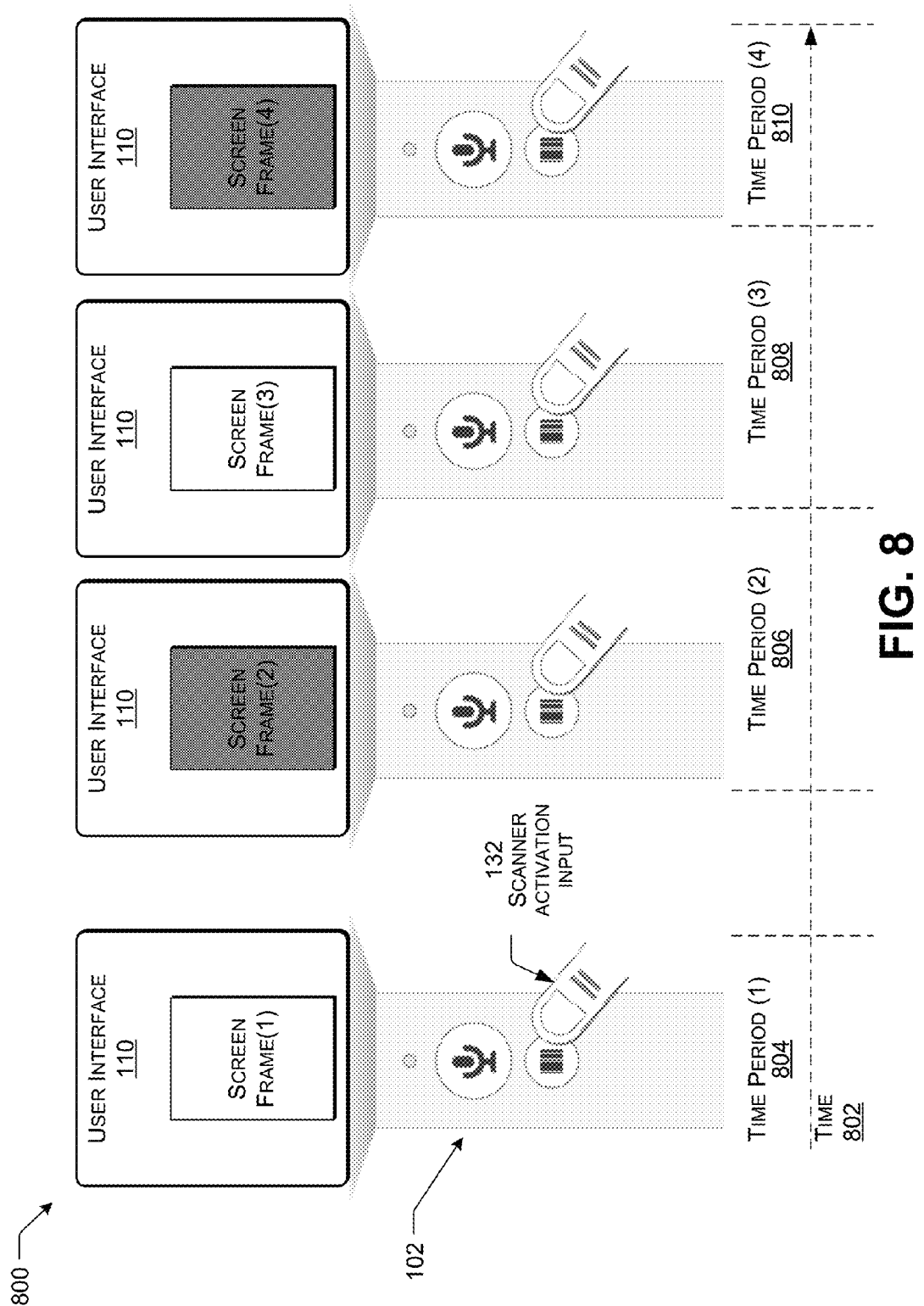
FIG. 8 illustrates an example of the sequence of frames of FIG. 7 displayed via a user interface, according to some implementations.

Referring to FIG. 8, an example of a screen frame sequence displayed on a display (e.g., a display of the electronic device 112 of FIGS. 1 and 2) via the user interface 110 is illustrated and generally designated 800.

FIG. 8 illustrates that each of the frames corresponding to the screen frames 714 in FIG. 7 are displayed in sequence via the user interface 110 for a particular period of time 802 for scanning via the scanner of the handheld electronic device 102.

For example, the first screen frame 716 (e.g., a white screen frame) may be displayed for a first period of time 804, identified in FIG. 8 as Time Period (1). The second screen frame 718 (e.g., a black screen frame) may be displayed for a second period of time 806, identified in FIG. 8 as Time Period (2). The third screen frame 720 (e.g., a white screen frame) may be displayed for a third period of time 808, identified in FIG. 8 as Time Period (3). The fourth screen frame 722 (e.g., a black screen frame) may be displayed for a fourth period of time 810, identified in FIG. 8 as Time Period (4).

As an illustrative non-limiting example, for sixty screen frames to be displayed in one second, each particular screen frame may be displayed for about $\frac{1}{60}^{th}$ of a second. To illustrate, in FIG. 8, the four screen frames 716-724 may each be displayed for about $\frac{1}{60}^{th}$ of a second.

Figure 9:
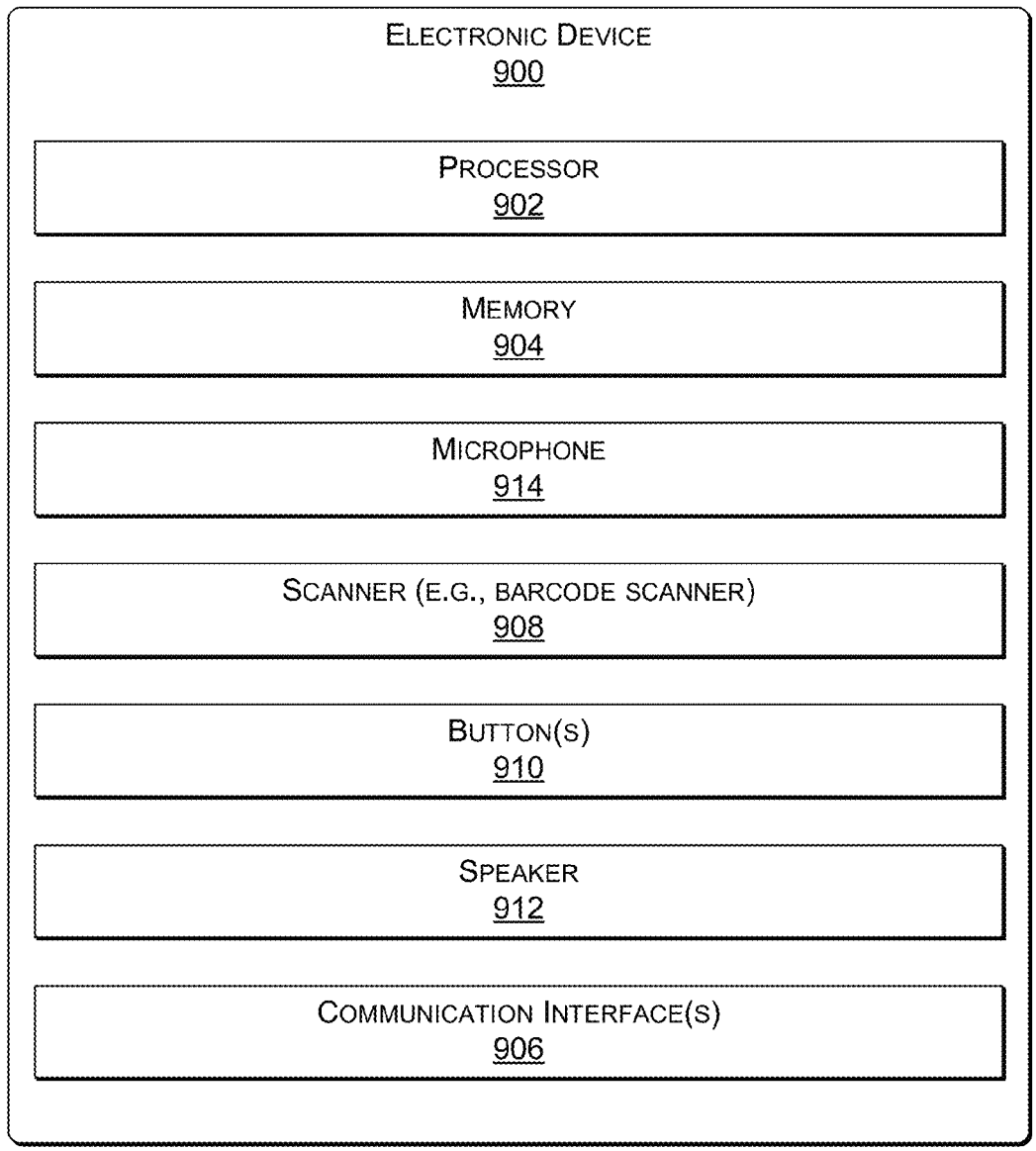
FIG. 9 illustrates select components of an example handheld electronic device, according to some implementations.

FIG. 9 illustrates select example components of an electronic device 900 that may be used to implement the functionality described above according to some implementations. The electronic device 900 illustrated in FIG. 9 may correspond to the handheld electronic device 102 of FIGS. 1, 2 and 8. In a very basic configuration, the electronic device 900 includes, or accesses, components such as at least one processor 902 and a memory 904. Each processor 902 may itself comprise one or more processors or cores. The processor(s) 902 can be configured to fetch and execute computer-readable instructions stored in the memory 904 or other computer-readable media.

Depending on the configuration of the electronic device 900, the memory 904 may be an example of non-transitory computer storage media and may include volatile and non-volatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 902 directly or through another computing device. Accordingly, the memory 904 may be computer-readable media able to maintain instructions, modules or components executable by the processor 902.

The memory 904 may be used to store any number of functional components that are executable by the processor 902. In some implementations, these functional components comprise instructions or programs that are executable by the processor 902 and that, when executed, implement operational logic for performing the actions attributed above to the electronic device 900. Functional components of the electronic device 900 stored in the memory 904 may include one or more components for controlling and managing various functions of the electronic device 900. Depending on the type of the electronic device 900, the memory 904 may also optionally include other functional components, which may include applications, programs, drivers and so forth.

The memory 904 may also store data, data structures, and the like that are used by the functional components. For example, data stored by the memory 904 may include barcode data associated with scanned item(s), and other identifier(s) such as a customer account identifier and/or a device identifier. The electronic device 900 may also include other data, which may include, for example, data used by the control logic and one or more other modules. Further, the electronic device 900 may include many other logical, programmatic and physical components, of which those described are merely examples that are related to the discussion herein.

While not shown in FIG. 9, in some cases, the electronic device 900 may include a display, which may be passive, emissive or any other form of display. In one implementation, the display may be an active display such as a liquid crystal display, plasma display, light emitting diode display, organic light emitting diode display, and so forth. Further, while not shown in FIG. 9, in some cases, the electronic device 900 may also include a camera (not shown).

In some embodiments, one or more communication interfaces 906 may support at least a wireless connection to various networks, such as a Wi-Fi network. Further, in some cases, the one or more communication interfaces 906 may support both wired and wireless connections to various networks, such as cellular networks, radio, Wi-Fi networks, short-range or near-field networks (e.g., Bluetooth®), infrared signals, local area networks, wide area networks, the Internet, and so forth. In some cases, the communication interfaces 906 may further allow a user to access storage on another device, such as a user's computing device, a network attached storage device, or the like. Further, the electronic device 900 may include a scanner 908 (e.g., a barcode scanner), as described above.

The electronic device 900 may further be equipped with various input/output (I/O) components. For example, the control logic of the electronic device 900 may include suitable drivers configured to accept input from one or more user actuatable controls and devices included as the I/O components. For instance, the user actuatable controls may include one or more buttons 908. To illustrate, the one or more buttons 910 may correspond to the first selectable control 106 and the second selectable control 108 as shown in the example of FIG. 1. Further, the electronic device 900 may include other I/O components, such as a power on/off button, selection keys, a speaker 912, a microphone 914, connection ports, and so forth. Additionally, the electronic device 900 may include various other components that are not shown, examples of which include removable storage, a power source, such as a battery and power control unit, a global positioning system (GPS) device, a PC Card component, and so forth.

FIG. 10 illustrates an example process 1000 for configuring a handheld electronic device, as described above. FIG. 10 illustrates the process 1000 as a collection of blocks in a logical flow diagram, which represents a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures and environments described in the examples herein, although the processes may be implemented in a wide variety of other architectures or environments.

At 1002, the process 1000 includes determining a registration barcode based at least in part on a registration token and one or more wireless credentials (e.g., Wi-Fi credentials).

At 1004, the process 1000 includes translating the registration barcode into a plurality of screen frames that are individually determined based on corresponding data in the registration barcode. In some cases, the individual screen frames are determined based on whether the corresponding data in the registration barcode includes a first portion of the registration barcode or a second portion of the registration barcode. For example, referring to FIG. 7, the individual screen frames 716-724 of the plurality of screen frames 714 may represent either a non-colored barcode portion (e.g., a "white" portion) or a colored barcode portion (e.g., a "black" portion).

At 1006, the process 1000 includes presenting individual screen frames of the plurality of screen frames in a screen frame sequence via a user interface. In some cases, a scanner may directly capture the individual frames in the sequence via a display of an electronic device upon which the screen frame sequence is presented. For example, referring to FIG. 1, the handheld electronic device 102 may not include an input device to provide the Wi-Fi credential(s). As such, presenting the individual screen frames in sequence via the user interface 110 may allow the handheld electronic device 102 to directly capture the individual frames via a display of another electronic device (e.g., the electronic device 112 of FIGS. 1 and 2).

As an illustrative example, the handheld electronic device 102 may determine the Wi-Fi credentials associated with the WAP by directly scanning the display of the electronic device 112. The handheld electronic device 102 may store the Wi-Fi credential(s) associated with the WAP, including the SSID 118 (e.g., "Guest" in the example of FIG. 1) and the (optional) password 120 (e.g., null in the example of FIG. 1), in the memory.

At 1008, the process 1000 includes connecting the handheld electronic device to the WAP using the Wi-Fi credential(s). For example, referring to FIG. 2, the handheld electronic device 102 may connect to the WAP (not shown in FIG. 2) using the Wi-Fi credential(s) in order to communicate with the one or more remote computing devices 202 via the network 114.

At 1010, the process 1000 includes registering the handheld electronic device using the registration token. For example, referring to FIG. 2, a registration service of the one or more remote computing devices 202 may receive the registration token 116 from the handheld electronic device 102 via the network 114. After determining that the registration token 116 received from the handheld electronic device 102 is valid, the registration service may register the handheld electronic device 102 to a particular customer account (determined based on the customer account information 204) in association with the device identifier 206.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
capturing, by a first electronic device, a registration barcode, wherein capturing the registration barcode comprises:
  capturing a first portion of the registration barcode presented by a second electronic device during a first period of time, and
  capturing one or more additional portions of the registration barcode presented by the second electronic device during one or more additional periods of time;
determining, by the first electronic device, a registration token and one or more wireless credentials based at least in part on the registration barcode, wherein the registration barcode comprises a combination of the first portion and the one or more additional portions of the registration barcode;
establishing, by the first electronic device, a wireless connection between the first electronic device and a wireless access point (WAP) using the one or more wireless credentials;
sending, by the first electronic device and via the wireless connection, an identifier of the first electronic device and the registration token to a registration service; and
receiving, at the first electronic device and at least partly in response to sending the identifier of the first electronic device and the registration token, an indication that the first electronic device has been registered with the registration service.

2. The method as recited in claim 1, further comprising receiving a permanent token from the registration service via the wireless connection, wherein the permanent token associates the first electronic device with a customer account.

3. The method as recited in claim 1, wherein capturing the registration barcode comprises scanning, by a scanner of the first electronic device, a display of the second electronic device that presents the registration barcode.

4. The method as recited in claim 1, wherein capturing the registration barcode comprising capturing, by a camera of the first electronic device, a display of the second electronic device that presents the registration barcode.

5. The method of claim 1, wherein capturing the registration barcode comprises:
capturing a first frame associated with a first portion of the registration barcode presented by the second electronic device during a first period of time; and
capturing a second frame associated with a second portion of the registration barcode presented by the second electronic device during a second period of time.

6. The method as recited in claim 1, wherein the registration barcode includes the first portion and the second portion.

7. A method comprising:
capturing, by a first electronic device using an optical component, a registration identifier presented by a second electronic device, the registration identifier associated with at least a registration token received by the second electronic device from a registration service that is remote from the second electronic device, wherein capturing the registration identifier comprises:
  capturing a first frame associated with a first portion of the registration identifier presented by the second electronic device during a first period of time, and
  capturing one or more additional frames associated with one or more additional portions of the registration identifier presented by the second electronic device during one or more additional periods of time;
determining connection information and the registration token based at least in part on the registration identifier, wherein the registration identifier comprises the first frame and the one or more additional frames;
connecting the first electronic device to a wireless access point (WAP) using the connection information;
sending, to register the first electronic device with the registration service, the registration token from the first electronic device to the registration service at one or more remote computing devices;
receiving, at the first electronic device, and based at least in part on the sending of the registration token, a permanent token from the registration service; and
storing the permanent token in a memory of the first electronic device.

8. The method as recited in claim 7, wherein the registration token sent from the first electronic device matches a token associated with a customer account.

9. The method as recited in claim 7, the operations further comprising sending a device identifier associated with the first electronic device from the first electronic device to the registration service.

10. The method as recited in claim 9, wherein the permanent token is generated based at least in part on the device identifier associated with the first electronic device.

11. The method as recited in claim 7, the operations further comprising receiving an indication of input associated with a selection of a button of the first electronic device, and wherein the capturing of the registration identifier is based at least in part on the receiving of the indication.

12. The method as recited in claim 7, the operations further comprising:
capturing an item to obtain an identifier of the item; and
transmitting the identifier of the item and the permanent token to a remote computing device.

13. The method as recited in claim 7, wherein the capturing device comprises a camera, and wherein capturing the registration identifier comprises capturing the registration identifier using the camera.

14. The method as recited in claim 7, wherein the capturing device comprises a scanner, and wherein capturing the registration identifier comprises scanning the registration identifier using the scanner.

15. The method as recited in claim 7, the operations further comprising sending a device identifier associated with the first electronic device from the first electronic device to the registration service at the one or more remote computing devices.

16. The method as recited in claim 7, wherein the registration identifier is further associated with the connection information, the connection information including an identifier associated with the first electronic device.

17. The method as recited in claim 7, wherein the registration identifier includes the first frame and the second frame.

18. A method comprising:
under control of one or more processors,
capturing, by a first electronic device, a first screen frame associated with a first portion of a registration identifier presented by a second electronic device;
capturing, by the first electronic device, one or more additional screen frames associated with one or more additional portions of the registration identifier presented by the second electronic device;
combining the first screen frame and the one or more additional screen frames to obtain the registration identifier;

determining a registration token and one or more network credentials from the registration identifier;

establishing a network connection using the one or more network credentials;

sending an identifier of the first electronic device and the registration token to a registration service via the network connection; and receiving, by the first electronic device and based at least in part on the sending the identifier of the first electronic device and the registration token, an indication that the first electronic device has been registered with the registration service.

19. The method as recited in claim 18, wherein:

the first screen frame is determined based at least in part on corresponding data in the registration identifier;

the one or more additional screen frames are determined based at least in part on the corresponding data in the registration identifier; and capturing the first screen frame comprises capturing the first screen frame for a first period of time; and capturing the one or more additional screen frames comprises capturing the one or more additional screen frames for one or more additional periods of time.

20. The method as recited in claim 18, wherein:

capturing the first screen frame comprises capturing a non-colored portion of the registration identifier; and capturing a second screen frame comprises capturing a colored portion of the registration identifier.

\* \* \* \* \*